United States Patent [19]

Nomiya

[11] 3,925,686

[45] Dec. 9, 1975

[54] LOGIC CIRCUIT HAVING COMMON LOAD ELEMENT

[75] Inventor: Kosei Nomiya, Tokyo, Japan

[73] Assignee: Hitachi, Ltd., Japan

[22] Filed: Nov. 6, 1973

[21] Appl. No.: 413,322

[30] Foreign Application Priority Data

Nov. 6, 1972 Japan .............................. 47-110319

[52] U.S. Cl. .............. 307/205; 307/215; 307/221 C; 307/224 C

[51] Int. Cl.² ...................H03K 19/08; H03K 19/34; H03K 19/22; G11C 19/20

[58] Field of Search ........ 307/205, 214, 215, 221 C, 307/224 C, 269

[56] References Cited

UNITED STATES PATENTS

| | | | |
|---|---|---|---|
| 3,365,707 | 1/1968 | Mayhew | 307/205 X |
| 3,497,715 | 2/1970 | Yen | 307/221 C X |
| 3,510,787 | 5/1970 | Pound et al. | 307/205 X |
| 3,526,783 | 9/1970 | Booher | 307/205 |
| 3,644,750 | 2/1972 | Campbell | 307/205 X |
| 3,700,981 | 10/1972 | Masahura et al. | 307/205 X |
| 3,775,693 | 11/1973 | Proebsting | 307/218 X |

OTHER PUBLICATIONS

West, "Practical Circuit Design Using M.O.S."; Design Electronics (pub.); pp. 30–32, 37–38; 3/1971.

"Low Threshold Voltages Switch MOS Registers"; Electronics (pub.); 8/21/1967; pp. 147–148.

Lohman, "Applications of MOSFETS in Microelectronics"; SCP and Solid State Technology (pub.); 3/1966; pp. 23–29.

*Primary Examiner*—Michael J. Lynch
*Assistant Examiner*—L. N. Anagnos
*Attorney, Agent, or Firm*—Craig & Antonelli

[57] ABSTRACT

A logic circuit comprises a first logic block composed of one or more metal-insulator-semiconductor field-effect transistors (MISFETs), a second logic block composed of one or more MISFETs, and a transfer gate MISFET adapted to be turned on and off between the first and second logic blocks: Current control MISFETs are connected in series with the respective logic blocks and driven by clock pulses differing in phase so as to prevent the current control elements from coincidentally turning on, and a load MISFET is commonly connected to the first and second logic circuit.

2 Claims, 5 Drawing Figures

LOGIC CIRCUIT HAVING COMMON LOAD ELEMENT

BACKGROUND OF THE INVENTION

1. Field of the Invention

The present invention relates to a logical circuit, particularly to a dynamic shift register, which is composed of insulated gate field-effect transistors (hereinbelow termed MISFETs).

2. Description of the Prior Art

In general, a logical circuit of the so-called EE type is known in which MISFETs of the enhancement type are used for both the load and driving or inverter MISFETs. Further, as one means to lower the power consumption thereof, there is known a clock drive circuit in which the load transistor is driven by clock pulses.

On the other hand, the ED type circuit employing a MISFET of the depletion type as a load transistor can make the supply voltage low. In addition, due to the constant-current characteristic of the depletion type MISFET, the ED type circuit has such excellent properties as low power consumption, and high speed operation. Further, the ED type circuit is more suitably formed into an integrated circuit than the EE type circuit with respect to a high degree of integration. As a fact to be noted of this circuit, whenever a driving transistor is conducting, a current flows through the series circuit including the load and driving transistors.

The present invention has been made in order to obtain a circuit which has the merits of both the foregoing ED type circuit and clock drive circuit. In the ED type circuit, the gate potential of the depletion type MISFET serving as the load must be kept constant relative to the source potential thereof. It is, therefore, difficult to drive the load directly by clock pulses.

To fulfill such features of the ED type circuit and the clock drive circuit, a circuit as shown in FIG. 5 has been proposed in U.S. patent application Ser. No. 381,485, entitled "MISFET LOGIC CIRCUIT HAVING DEPLETION TYPE LOAD TRANSISTOR", filed July 23, 1973, and assigned to the assignee of the present application.

In the circuit shown in FIG. 5, $Q_{r1}$ to $Q_{r4}$ are depletion type MISFETs used as load transistors. $Ql_1$ to $Ql_4$, $Q_{s1}$ to $Q_{s4}$, $Q_{g1}$ and $Q_{g2}$ are enhancement type MISFETs.

Each of the transistors $Q_{r1}$ to $Q_{r4}$ has its gate electrode connected to its source electrode to obtain a good constant-current characteristic.

In the circuit arrangement in FIG. 5, the enhancement type MISFETs $Ql_1$–$Ql_4$ are respectively connected to the depletion type load MISFETS $Qr_1$–$Qr_4$. The enhancement type MISFET $Qg_1$ for current limitation is connected in common with the source electrodes of the MISFETs $Ql_1$ and $Ql_3$, and has clock pulses $\phi_1$ applied to its gate electrode. The MISFET $Qg_2$ is connected in common with the source electrodes of the MISFETs $Ql_2$ and $Ql_4$, and has applied to its gate electrode clock pulses $\phi_2$ which differ in phase from the clock pulses $\phi_1$.

The MISFETs $Qr_1$, $Ql_1$ and $Qg_1$ constitute an inverter circuit (NOT circuit). Similarly, the other MISFETs constitute three respective inverter circuits. The respective inverter circuits are connected in cascade through transfer gate circuits constructed of the enhancement type MISFETs $Qs_1$–$Qs_3$. An output signal is provided from the inverter circuit at the final stage through the MISFET $Qs_4$. The clock pulses $\phi_1$ are applied to the gate electrodes of the MISFETs $Qs_1$ and $Qs_3$, while the clock pulses $\phi_2$ are applied to the gate electrodes of the MISFETs $Qs_2$ and $Qs_4$. Applied to the gate electrode of the MISFET $Ql_1$ are input signals $V_{in}$ which are synchronized with the clock pulses $\phi_2$.

With such a construction, in the proposed circuit, the inverter circuits operate only during the periods of time during which the clock pulses are applied. Thus, an ED type MIS circuit which is capable of clock drive operation is realized.

There is a general requirement of increasing the density of circuit elements in an integrated circuit. To this end, a further improvement is necessary in the ED type MIS circuit capable of clock drive operation.

SUMMARY OF THE INVENTION

It is an object of this invention to provide a MIS circuit which can be built as a semiconductor integrated circuit with improved circuit element density, low power consumption, and high speed operation.

It is another object of the present invention to provide an ED type MIS circuit which can be clock-driven.

According to one embodiment, a logic circuit according to this invention is characterized by a common load of a depletion type MOSFET commonly connected to a pair of inverter circuits each of which includes a series connection of an inverter MOSFET and a current limiting MOSFET, both of enhancement type. The current limiting transistors are clock-driven by clock pulses to be alternately rendered conductive.

The characterizing features of the present invention will become apparent from the following detailed description taken in conjunction with the accompanying drawings.

PREFERRED EMBODIMENTS OF THE INVENTION

Figure 1:
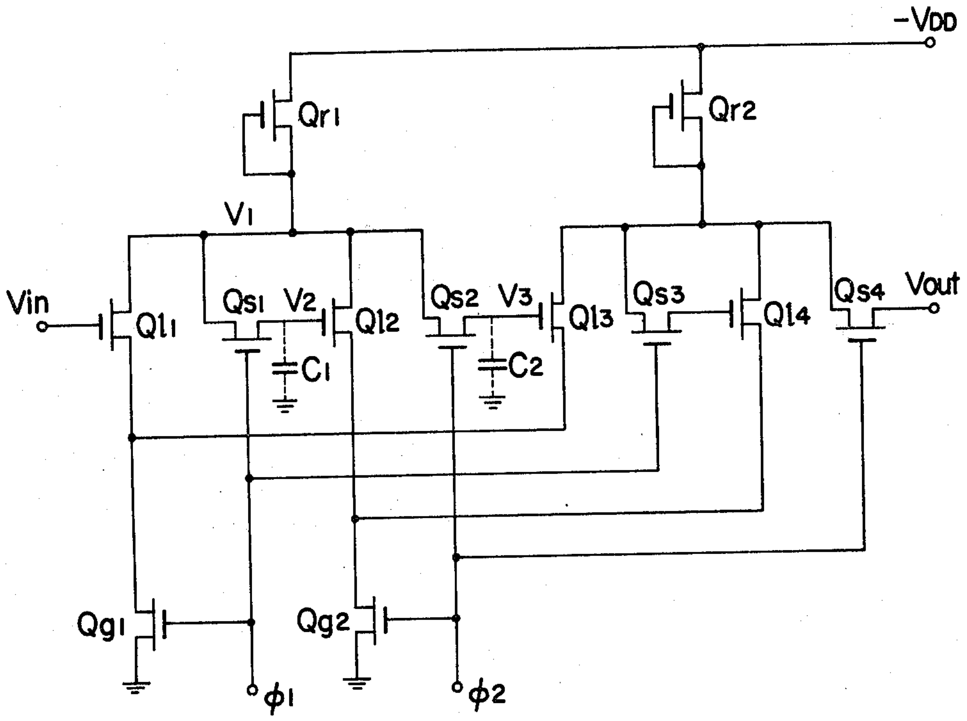
FIG. 1 is a diagram of an embodiment of the MISFET logical circuit employing a depletion type load transistor according to the present invention.

FIG. 1 is a circuit diagram of a shift register according to the present invention. $Qr_1$ and $Qr_2$ designate MISFETs of the depletion type in which even when the bias voltage between the gate and the source is 0 V, a fixed current flows between the source and the drain. They are used as load transistors.

On the other hand, $Ql_1$–$Ql_4$, $Qs_1$–$Qs_4$ and $Qg_1$ as well as $Qg_2$ are MISFETs of the enhancement type in which when a bias voltage above a certain threshold level is applied between the gate and the source, a current flows between the source and the drain for the first time.

In order to provide a good constant-current characteristic, each of the MISFETs $Qr_1$ and $Qr_2$ has its gate electrode connected to its source electrode.

The current-limiting elements (MISFETs) $Qg_1$ and $Qg_2$ are respectively connected in series with the first logical blocks (MISFETs $Ql$ with odd reference numerals) $Ql_1$ and $Ql_3$ and the second logical blocks (MIS- FETs $Ql$ with even reference numerals) $Ql_2$ and $Ql_4$, the logical blocks satisfying a predetermined logic relationship.

The MISFETs $Ql_1$ and $Qg_1$ constitute an inverter circuit. Similarly, the other combination of MISFETs $Ql_2$ and $Qg_2$, $Ql_3$ and $Qg_1$, and $Ql_4$and $Qg_2$ constitute inverter circuits, respectively. The inverter circuits are connected in cascade through the enhancement type MISFETs $Qs_1$–$Qs_3$ for transfer. From the inverter circuit at the final stage, an output signal is derived through the MISFET $Qs_4$. The load transistor $Qr_1$ is connected in common with the inverter transistors $Ql_1$ and $Ql_2$ for supplying a potential from a power source $-V_{DD}$ to the logical blocks. Similarly, the load $Qr_2$ is connected in common with the inverter transistors $Ql_3$ and $Ql_4$. The transfer transistor $Qs_1$ is connected between the drain of transistor $Ql_1$ and the gate of transistor $Ql_2$. Similarly, the transistors $Qs_2$ and $Qs_3$ are connected between transistors $Ql_2$ and $Ql_3$ and between transistors $Ql_3$ and $Ql_4$, respectively. The output is derived from the drain of transistor $Ql_4$ through transfer transistor $Qs_4$.

A train of clock pulses $\phi_1$ is applied to the gate electrodes of the current-limiting element $Qg_1$ and the transfer elements $Qs_1$ and $Qs_3$, while a train of clock pulses $\phi_2$ is applied to the gate electrodes of the current-limiting element $Qg_2$ and the transfer elements $Qs_2$ and $Qs_4$. The clock pulses $\phi_1$ and $\phi_2$ differ in phase so as to be prevented from simultaneously turning "on" all the MISFETs. An input signal $V_{in}$ synchronized with the clock pulse $\phi_2$ is applied to the gate electrode of the MISFET $Ql_1$.

Figure 2:
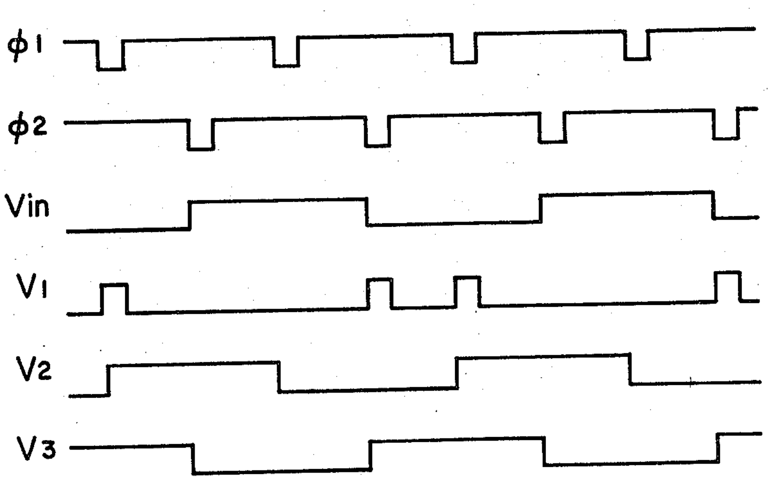
FIG. 2 is a timing diagram for explaining the operation of the shift register in FIG. 1.

The operation of the shift register thus constructed will now be explained with reference to the timing diagram shown in FIG. 2. In the figure, the upper level of each signal indicates a logical "1" (ground potential), while the lower level represents a logical "O" (a negative potential).

When the clock pulse $\phi_1$ becomes O to render the MISFET $Qg_1$ conductive, the output signal of the first inverter circuit or the drain voltage $V_1$ of the MISFET $Ql_1$ becomes the inverted signal of the input signal $V_{in}$.

Since, at this time, the transfer MISFET $Qs_1$ is also conductive, the output signal $V_1$ is fed therethrough to the MISFET $Ql_2$ and is stored in the gate capacitance $C_1$ of the MISFET $Ql_2$. Since the circuit of the present invention uses the load in common, the output signal $V_1$ from the input signal is delivered as the drain - source potential of the MISFET $Ql_2$ being the inverter circuit at the succeeding stage. Herein, since the current-limiting MISFET $Qg_2$ which is controlled by the clock pulse $\phi_2$ is not conductive, no current flows therethrough, and the delivery of the output signal $V_1$ is not affected by the output of the second logical circuit. Next, the clock pulse $\phi_1$ becomes 1, the MISFET $Qg_1$ turns "off", and the inverter circuit at the first stage reverts to the original state. At this time, the charge stored in the gate capacitance $C_1$ of the MISFET $Ql_2$ is retained.

When the clock pulse $\phi_2$ becomes O to turn the MISFETs $Qg_2$ and $Qs_2$ on, the inverted signal of the signal stored in the MISFET $Ql_2$ is written into the gate capacitance $C_2$ of the MISFET $Ql_3$. At this time, for a reason similar to the above, the second stage inverter circuit is not influenced by the first stage.

Thus, because the gate voltage $V_2$ of the MISFET $Ql_2$ is synchronized with the clock pulse $\phi_1$ and the input signal $V_{in}$ is synchronized with the clock pulse $\phi_2$, the gate potential $V_2$ becomes equal to a signal with the input signal $V_{in}$ delayed by a phase difference between the clock pulses $\phi_1$ and $\phi_2$. Since the periods of the clock pulse series $\phi_1$ and $\phi_2$ are equal, the gate potential $V_3$ of the MISFET $Ql_3$ ultimately becomes equal to a signal with the input signal $V_{in}$ delayed by one period (one bit) of the clock pulse series $\phi_1$ or $\phi_2$.

Figure 3:
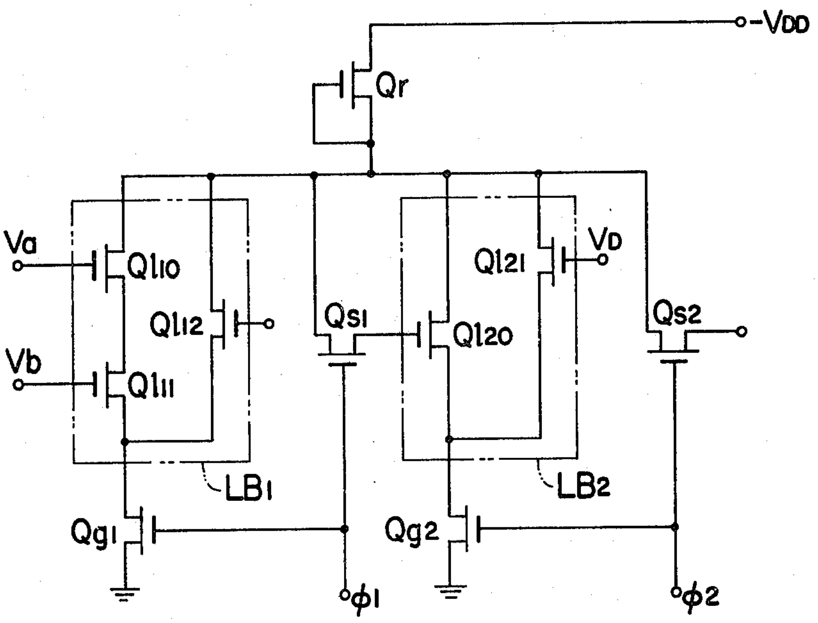
FIGS. 3 and 4 are circuit diagrams each showing another embodiment of the present invention.

FIG. 3 shows another embodiment of the present invention. In the embodiment, the inverter transistor $Ql_1$ in FIG. 1 is replaced by a multi-input logic block $LB_1$ which is constituted by series connected inverter MOSFETs $Ql_{10}$ and $Ql_{11}$ of enhancement type and an inverter MOSFET $Ql_{12}$ of enhancement type connected in parallel with the series circuit of transistors $Ql_{10}$ and $Ql_{11}$. The transistors $Ql_{10}$ to $Ql_{12}$ are supplied with various input signals Va to Vc at their gate electrodes, respectively.

Also, the inverter transistor $Ql_2$ is replaced by a multiinput logic block $LB_2$ which is constituted by parallel-connected inverter MOSFETs $Ql_{20}$ and $Ql_{21}$ of the enhancement type. To the gate of transistor $Ql_{20}$, the output of logic block $LB_1$ is applied through transfer gate MOSFET $Qs_1$. The MOSFET $Ql_{21}$ is supplied with an appropriate input signal $V_D$ at its gate.

The circuit of FIG. 3 having the common load MOSFET of depletion type can be clock-driven by the clock pulses $\phi_1$ and $\phi_2$ applied to the transistors $Qg_1$ and $Qg_2$ in the same manner as in the circuit of FIG. 1.

Figure 4:
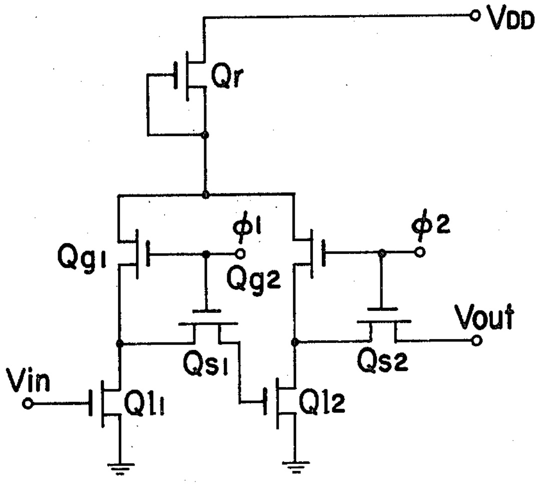
Figure 5:
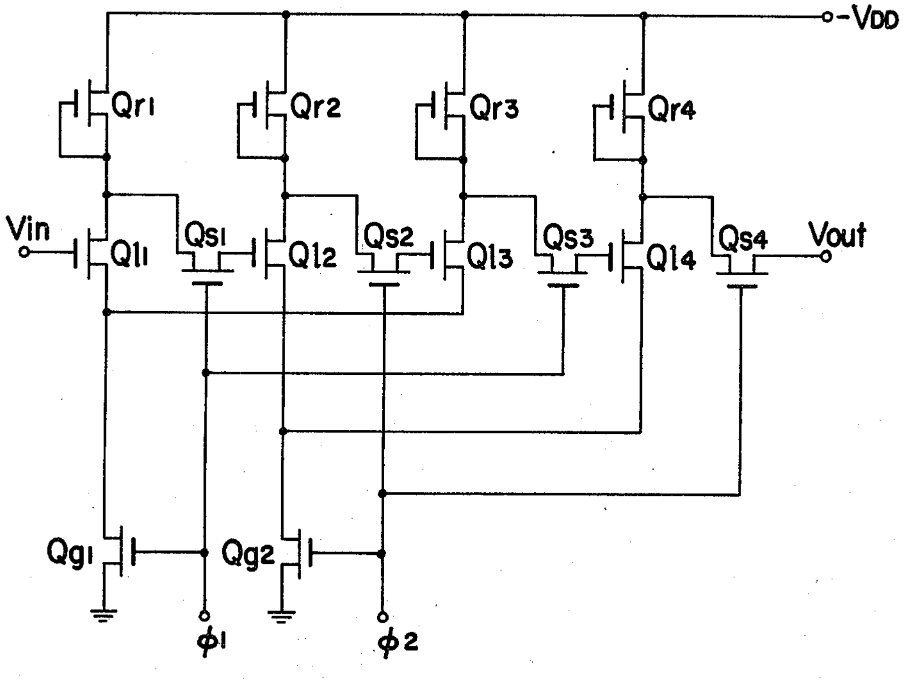
FIG. 5 is a circuit diagram of a shift register which has been previously proposed.

Further, gate element MISFETs $Qg_1$ and $Qg_2$ may also be inserted, as shown in FIG. 4, between a load MISFET $Qr$ and logical block MISFETs $Ql_1$ and $Ql_2$. In this case, the same effect in circuitry is obtained.

Although the foregoing embodiments are driven by the two-phase clock pulses $\phi_1$ and $\phi_2$, the present invention can be similarly performed in cases of three or more phases.

Needless to say, the present invention is also applicable to a load which cannot be driven directly by pulses, as in the case of using a mere resistance in place of the load MISFET $Qr$, or to an enhancement type MISFET load in the case where the clock drive of the load is impossible due to the layout of elements and wiring in the integration of the circuitry.

Owing to the ED system especially employing the MISFET of the depletion type as the load in the present invention of the foregoing construction, the supply voltage can be made low. Owing to the constant-current characteristic of the depletion type MISFET, the excellent properties of low power consumption, high speed and high degree of integration are attained. Also, owing to the adoption of the clock drive, a decrease in the power consumption is accomplished. Furthermore, the number of load elements is reduced by half.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What I claim is:

1. A logic circuit having first and second clock controlled logic stages, each logic stage comprising:

a depletion type load MISFET having a drain electrode connected to a first terminal, a source electrode connected to a second terminal and a gate electrode connected to said second terminal;

a first logic block connected between said second terminal and a third terminal, said first logic block comprising at least one first MISFET having a gate electrode, a drain electrode electrically connected to said second terminal and a source electrode electrically connected to said third terminal;

a second logic block connected between said second terminal and a fourth terminal, said second logic block comprising at least one second MISFET having a gate electrode, a drain electrode electrically connected to said second terminal and a source electrode electrically connected to said fourth terminal;

said depletion load MISFET acting as a common load for the transistors in said first and second logic blocks;

a third MISFET having a gate electrode, a drain electrode connected to said third terminal and a source electrode connected to a ground terminal;

a fourth MISFET having a gate electrode, a drain electrode connected to said fourth terminal and a source electrode connected to the ground terminal;

a fifth MISFET having a gate electrode and two output electrodes, one of said output electrodes being connected to said second terminal and the other output electrode being connected to the gate electrode of said at least one second MISFET in said second logic block;

a sixth MISFET having a gate electrode and two output electrodes, one of the output electrodes being connected to the second terminal;

means for applying an electrical potential to said first terminal;

means for applying a first clock pulse signal simultaneously to the gate electrodes of said third MISFET and said fifth MISFET;

means for applying a second clock pulse signal simultaneously to the gate electrodes of said fourth MISFET and said sixth MISFET, said second clock pulse signal being different from said first clock pulse signal in phase; and means for applying an input signal to the gate electrode of said first MISFET, wherein said third and fourth MISFETs, respectively, of said first logic stage are the third and fourth MISFETs of said second logic stage.

2. A logic circuit according to claim 1, wherein all of the MISFETs in said first and second logic blocks and said third, fourth, fifth and sixth MISFETs are of enhancement type.

* * * * *